United States Statutory Invention Registration [19]

[11] Reg. Number: H482

Berryhill et al. [43] Published: Jun. 7, 1988

[54] SEISMIC MIGRATION METHOD

[76] Inventors: John R. Berryhill, 4645 Wild Indigo, #370, Houston, Tex. 77027; Ruth Gonzalez, 12205 Lemon Ridge La., Houston, Tex. 77035; Young C. Kim 15310 Glenwood Park Dr., Houston, Tex. 77095

[21] Appl. No.: 920,552

[22] Filed: Oct. 20, 1986

[51] Int. Cl.[4] ..... G01V 1/00

[52] U.S. Cl. ..... 367/38; 367/50; 364/421

[58] Field of Search ..... 364/421; 367/38, 49, 367/50, 51, 54, 63

[56] References Cited

PUBLICATIONS

Dubrulle, A. A., "On Numerical Methods for Migration in Layered Media," Geophysical Prospecting, vol. 31, pp. 237–264, 1983.

Berryhill, J. R., "Wave-Equation Datuming," Geophysics, vol. 44, #8, Aug. 1979.

Berkhout et al., "Recursive Migration in Three Dimensions," Geophysical Prospecting, vol. 29, #5, pp. 758–781, Oct. '81.

R. H. Stolt, "Migration by Fourier Transform," Geophysics, vol. 43, No. 1, pp. 23–48 (Feb., 1978).

J. Gazdag, "Wave Equation Migration with the Phase-Shift Method," Geophysics, vol. 43, No. 7, pp. 1342–1351 (Dec., 1978).

J. Gazdag, "Wave Equation Migration with the Accurate Space Derivative Method", Geophysical Prospecting, vol. 28, pp. 60–70 (1980).

*Primary Examiner*—Stephen C. Buczinski

*Assistant Examiner*—Linda J. Wallace

[57] ABSTRACT

A seismic data processing method in which seismic traces (each trace containing a signal resulting from reflection of a seismic signal at a location within the earth, and each trace being associated with at least one point in a two-dimensional spatial grid (x,y)) are subjected to Fourier transformations, the coefficients of the Fourier-Transformed traces are subjected to a recursive KF migration operation, and the migrated traces are thereafter inverse-Fourier-transformed. When displayed, the processed seismic data accurately represents the position within the earth of whatever caused the reflection. The method may be employed to process stacked seismic traces, each associated with a single point (x,y) in the grid, or may be employed to process unstacked seismic traces, each associated with both a seismic source location ($x_s$,$y_s$) and a different seismic receiver location ($x_r$,$y_r$) in the grid. In performing the method, the earth is modeled as a stack of M horizontal layers each characterized by a seismic wave velocity. The recursive KF migration step is iterated M−1 times for each trace, where part of the output of each iteration is stored and part discarded.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SEISMIC MIGRATION METHOD

FIELD OF THE INVENTION

This invention is a method for processing seismic data. More particularly, the invention is an improved seismic migration technique of the type in which seismic data are Fourier-Transformed (or subjected to cosine or sine transformations), the coefficients of the transformed data are thereafter processed ("migrated"), and the processed coefficients are thereafter inverse-Fourier-transformed (or subjected to inverse-cosine or inverse-sine transformations).

BACKGROUND OF THE INVENTION

There are several types of conventional techniques for migrating seismic data. The objective of all migration techniques is to generate a display of processed seismic data in which the position of each seismic reflection indicated by the display accurately represents the position within the earth of whatever caused the reflection.

In one conventional class of seismic migration techniques, known as "KF-migration" (or "FK-migration") techniques, the seismic data to be processed are first Fourier-transformed, then the Fourier-coefficients are migrated, and thereafter, the migrated coefficients are inverse-Fourier-transformed. Examples of such KF-migration methods are described in the following papers: R. H. Stolt, "Migration by Fourier Transform," *Geophysics,* V. 43, No. 1 (February, 1978), pp. 23–48; J. Gazdag, "Wave Equation Migration with the Phase-Shift Method," *Geophysics,* V. 43, No. 7 (December, 1978), pp. 1342–1351; and J. Gazdag, "Wave Equation Migration with the Accurate Space Derivative Method," *Geophysical Prospecting,* V. 28, (1980), pp. 60–70.

A drawback of conventional KF-migration techniques of the type described in the Stolt paper is that they require that the relationship between depth of a reflector in the earth and the seismic wave traveltime to and from the reflector must be represented as a single fixed ratio. In other words, those methods require that the velocity of seismic waves in the earth be represented as a constant.

The Gazdag (1978) technique has the disadvantage that it is time-consuming and expensive to implement, for a number of reasons, including the reason that the number of operations required to migrate each seismic trace in accord with the Gazdag (1978) technique is proportional to $N^2$, where N is the number of data points (or samples) comprising the trace. The Gazdag (1980) technique, too, has the disadvantage of being time-consuming and expensive to implement.

The present invention represents an improvement over conventional KF-migration techniques because it facilitates efficient migration of seismic data without requiring that the velocity of the associated seismic waves be represented as a constant. Rather, the invention requires only that the earth be represented as a sequence of uniform horizontal layers, each layer having a characteristic velocity, or ratio of depth increment to traveltime. The number of operations required to migrate a single trace in accord with the present invention is proportional to N log N, where N is the number of data points (or samples) comprising the trace.

SUMMARY OF THE INVENTION

The preferred embodiment of the invention includes the following nine steps:

1. Determining the reference time-depth relation;
2. Conforming each seismic trace of the input data to the reference time-depth relation;
3. Performing a Discrete Fourier Transform over the x-coordinate of each conformed trace;
4. Performing a Discrete Fourier Transform over the y-coordinate of each conformed trace;
5. Performing a Discrete Fourier Transform on the time coordinate of each conformed trace;
6. Performing the process known as "Recursive KF Migration" on the data after they have been processed in accordance with steps 1–5;
7. Performing a Discrete Inverse Fourier Transform over the y-coordinate of each migrated data trace;
8. Performing a Discrete Inverse Fourier Transform over the x-coordinate of each migrated data trace; and
9. After processing the data in steps 1–8, restoring the processed data's individual time-depth relations.

The earth is modeled as a stack of M horizontal layers, each having, in general, a different seismic wave velocity. The sixth step of the preferred embodiment ("recursive KF migration") is a sequence of operations performed $M-1$ times in succession (as an index j assumes values from 2 through M) for each transformed seismic trace. Recursive KF migration reassigns new values to the data points comprising the traces to approximate changes in the wave field as the associated source-receiver pair is "moved" downward into the earth. No interpolation is required in performing the recursive KF migration step of the invention. Rather, during each of the $M-1$ iterations for each trace, each data point of the trace is reassigned a single new value (that may be stored in a single computer storage location), and some of these new values are stored while the rest of these new values are discarded. The stored values remaining after all $M-1$ iterations are the result of applying the recursive KF migration operation to the relevant trace.

In alternative embodiments, steps 2 and 9 are omitted. The output traces produced in accord with any embodiment of the invention may be displayed in form meaningful to an interpreter using any of several suitable conventional methods and means.

DETAILED DESCRIPTION OF THE PREFERRED EMBODIMENT

Figure 1:
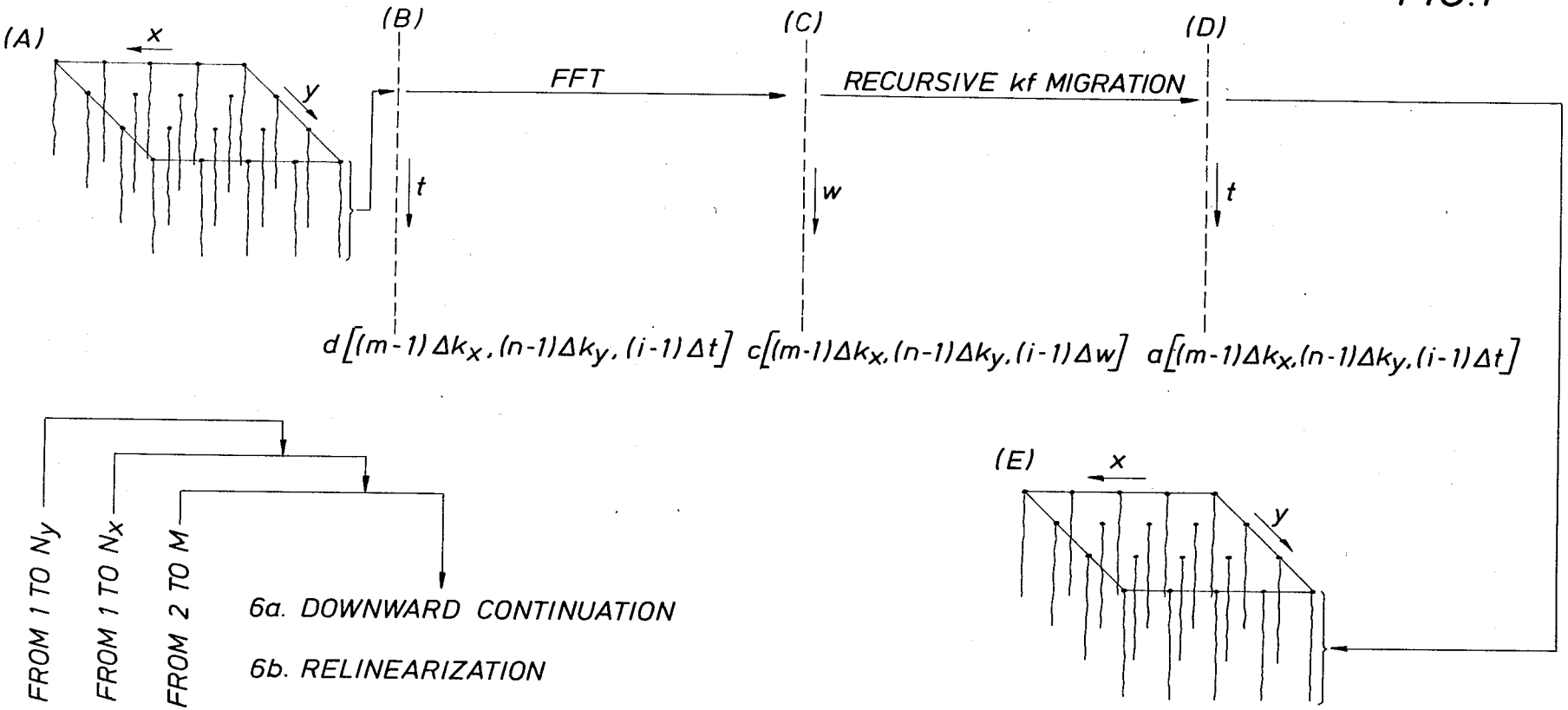
FIG. 1 is a diagram showing an unprocessed set of seismic traces, intermediate states of representative ones of these traces as they are processed in accord with the inventive method, and a set of traces in processed form after the invention has been applied thereto.

The steps of the preferred embodiment will first be described in detail with reference to FIG. 1. Variations on this preferred embodiment will than be described. Thereafter, the sixth step of the preferred embodiment (known as "recursive KF migration") will be described in greater detail with reference to FIG. 2.

The seismic data to be processed in accordance with the preferred embodiment will be described with reference to Cartesian coordinate system (x,y,z), where the x-axis and y-axis are horizontal, and the z-axis is vertical. The seismic data are a set of seismic traces $g(x,y,t_i)$. There is one trace for each horizontal position (x,y). An example of a set of traces to be processed in accord with the invention is set A of traces shown in FIG. 1. In FIG. 1, set A includes twenty traces. It should be appreciated that a more typical set of traces to be processed in accord with the invention will be a 256 trace by 512 trace array of 131,072 traces, or an even larger array of traces. The parameters $t_i$ for each trace comprise a set of N time instants separated by sampling interal $\Delta t$. Each set $t_i$ may be described using the notation: $\{t_i=i\Delta t: 1\leqq i\leqq N\}$. It is within the scope of the invention to process data associated with only a single value of x (or y), or with many values of x and y (i.e., the method may be performed to process 2-D or 3-D data). For simplicity, it will be assumed for purposes of describing the preferred embodiment, that each trace represents the stacked electrical output of a number of acoustic receivers. For each instant $t_i$, the outputs of the receivers are stacked together so that each stacked data point is associated with a single position (x,y) and a particular sample time $t_i$, and trace $g(x,y,t_i)$ is a stacked seismic trace associated with single position (x,y). For a given trace, the sum of the receiver outputs at instant $t_i$ is represented by the numerical value $g_i=g(x,y,t_i)$.

Despite the actual positions of the seismic source and receiver (or receivers) associated with each trace $g(x,y,t_i)$, the trace may be regarded as representing the output of an acoustic receiver at position (x,y) over an interval of time ($0\leqq t\leqq N\Delta t$) resulting from actuation of a seismic source at the same position (x,y) at $t=0$. It is presumed that each trace is indicative of at least one signal resulting from reflection by a subterranean reflector of the seismic wave proceeding outward from the source. It is further presumed that there exists a known or assumed relationship between the arrival time ($t_i$) of each reflection at mesh point (x,y) and the depth ($z_i$) of any real or hypothetical reflecting object directly below mesh point (x,y). The relationship between time and depth specified for each such regularly spaced time instant may be described using the notation $\{t_i, z_i: 1\leqq i\leqq N\}$.

The first step of the preferred embodiment of the invention is performed as follows. For each time sample ($t_i$), add together the depth values specified for each (x,y) mesh point and divide the sum by the number of addends. In other words, for each sample $t_i$, generate $$z_i^{av} = (1/N_xN_y)\left[\sum_{m=1}^{N_x}\sum_{m=1}^{N_y} z_{imn}\right]$$

where the set of all mesh points (x,y) is $\{x_{mn}, y_{mn}: 1\leqq m\leqq N_x, 1\leqq n\leqq N_y\}$, and $Z_{imn}$ is the member of set $z_i$ associated with mesh point $x_{mn}$, $y_{mn}$. This produces the average time-depth relation, a set of depth values ($z_i^{av}$) corresponding one to each time sample of the seismic traces. From the resulting set of time-depth pairs $\{t_i=t_i^{av}, z_i^{av}, 1\leqq i\leqq N\}$ select the reduced set $\{t_j^{ref}, z_j^{ref}: 1\leqq j\leqq M, M<N\}$, constituting the reference time-depth relation, to satisfy the rules $t_1=t_1^{ref}=t_1^{ref}=z_1^{av}$, $|t_i^{av}-[t_{j-1}^{ref}+(z_i^{av}-z_{j-1}^{ref})(t_j^{ref}-t_{j-1}^{ref})/(z_j^{ref}-z_{j-1}^{ref})]|<E$, *where* $t_{j-1}^{ref}<t_i^{av}\leqq t_j^{ref}$, and E is a selected acceptable tolerance. The feasibility of the invention proceeds from the observation that M may be of order 10 while N is of order 1000, if E is of order $10\Delta t$.

Each seismic trace of the input data is associated with its individual time-depth relationship $\{t_i, z_i: 1\leqq i\leqq N\}$ defining the time and depth for each sample of the trace. The second step of the preferred embodiment is conforming the input seismic traces to the reference time-depth relationship. This second step includes the sub-step of assigning each sample a modified time $t'_i$ according to the scheme $$t'_i=t_{j-1}^{ref}+(t_j^{ref}-t_{j-1}^{ref})(z_i-z_{j-1}^{ref})/(z_j^{ref}-z_{j-1}^{ref}),$$

where $z_{j-1}^{ref}\leqq z_i\leqq z_j^{ref}$. The resulting seismic trace $\{t'_i, g_i\}$ is not sampled at regular time intervals. The second sub-step of the second inventive step is to construct from each trace $\{t'_i, g_i\}$ the regularly sampled conformed trace $\{(i-1)\Delta t, f_i\}$ according to the scheme $f_i=g_{j-1}+(g_j-g_{j-1})((i-1)\Delta t-t'_{j-1})/(t'_j-t'_{j-1})$, where $t'_{j-1}\leqq(i-1)\Delta t\leqq t'_j$.

The set of conformed input traces $\{(i-1)\Delta t, f_i\}$ may be represented as $f[m-1)\Delta x, (n-1)\Delta y, (i-1)\Delta t]$; where $1\leqq m\leqq N_x$, $1\leqq n\leqq N_y$, $1\leqq i\leqq N$. The third step of the preferred embodiment is to subject this set of $N_xN_yN$ numbers to a Discrete Fourier Transform on index m to produce set of values $e[(m-1)\Delta k_x, (n-1)\Delta y, (i-1)\Delta t]$, where $\Delta k_x=1/(N_x\Delta x)$ and $1\leqq m\leqq N_x$.

In the fourth step of the preferred embodiment, the set of signals e is subjected to a Discrete Fourier Transform on index n to become set of signals $d[m-1)\Delta k_x, (n-1)\Delta k_y, (i-1)\Delta t]$, where $\Delta k_y=1/(N_y\Delta y)$ and $1\leqq n\leqq N_y$.

In the fifth step of the preferred embodiment, the set of signals d is subjected to a Discrete Fourier Transform on index i to become set of signals $c[(m-1)\Delta k_x, (n-1)\Delta k_y, (i-1)\Delta w]$ where $\Delta w=1/(N\ \Delta t)$ and $1\leqq i\leqq N$. The Discrete Fourier Transform in any of steps 3, 4, and 5 may be performed using any of several suitable conventional implementations thereof. See, for example, G. D. Bergland, "A Guided Tour of the Fast Fourier Transform," IEEE Spectrum, 6, pp 41-52 (July, 1969) for a discussion of the Discrete Fast Fourier Transform.

The steps two, three and four are represented in FIG. 1 by generation of all the traces $d[(m-1)\Delta k_x, (n-1)\Delta k_y, (i-1)\Delta t]$ represented by single trace B from set A. Step five is represented in FIG. 1 by transformation of all traces represented by trace B into set of transformed traces $c[(m-1)\Delta k_x, (n-1)\Delta k_y, (i-1)\Delta w]$ represented by single signal C.

The set of signals represented by signal C is next transformed into the set of numerical signals $a[(m-1)\Delta k_x, (n-1)\Delta k_y, (i-1)\Delta t]$ according to the "Recursive KF Migration" method described below. This recursive KF migration method (step six of the preferred embodiment) is a key element of all embodiments of the invention, and is represented in FIG. 1 by transformation of single signal C into signal D. In the FIG. 1 example, should it be understood that during step six, the recursive KF migration operation will be repeated to process each of the signals (all represented by signal C) resulting from performance of step five.

In the seventh step of the preferred embodiment, the set of signals a is subjected to a Discrete Inverse Fourier Transform on index n to become set of signals $h[(m-1)\Delta k_x, (n-1)\Delta y, (i-1)\Delta t]$. The Discrete Inverse Fourier Transform of this step seven (and of step eight below) may be performed using any of several suitable conventional implementations thereof.

In the eighth step of the preferred embodiment, the set of numerical signals h is subjected to a Discrete Inverse Fourier Transform on index m to become set of signals $q[(m-1)\Delta x, (n-1)\Delta y, (i-1)\Delta t]$. The resulting set q of numerical values is a set of migrated conformed output traces. To select a pair of particular values (m,n) is to specify a particular migrated conformed output trace $\{(i-1)\Delta t, q_i; 1 \leqq i \leqq N\}$ associated with the time-depth relationship at mesh point $((m-1)\Delta x, (n-1)\Delta y)$.

In the ninth step of the preferred embodiment, to compensate for the effect of step two described above, each sample is assigned a modified time $t_i$ according to the scheme $t_i = t_{j-1} + (t_j - t_{j-1})(z'_i - z_{j-1})/(z_j - z_{j-1})$ where $z_{j-1} < z'_i \leqq z_j$; and $\{t_j, z_j; 1 \leqq j \leqq N\}$ is the time-depth relationship at the mesh point; and $z'_i = z_{j-1}^{ref} + (z_j^{ref} - z_{j-1}^{ref})((i-1)\Delta t - t_{j-1}^{ref})/(t_j^{ref} - t_{j-1}^{ref})$, with $t_{i-1}^{ref} < (i-1)\Delta t \leqq t_j^{ref}$. The resulting migrated trace $(t_i, q_i)$ is not sampled at regular time intervals. From it is constructed the regularly sampled migrated output trace $\{(i-1)\Delta t, p_i\}$ according to the scheme $p_i = q_{j-1} + (q_j - q_{j-1})((i-1)\Delta t - t_{j-1})/(t_j - t_{j-1})$. Steps seven, eight, and nine are represented in FIG. 1 by transformation of the set of signals represented by single signal D into set E, and will be carried out to process all the signals produced as a result of step six.

Performance of all nine steps of the preferred embodiment of the invention results in generation of a migrated output trace $\{(i-1)\Delta t, p_i; 1 \leqq i \leqq N\}$ for each of the mesh points (x,y) associated with an input trace. An example of a set of migrated output traces generated in accord with the invention is set E of traces shown in FIG. 1. The output traces produced in accord with the invention may be displayed in form meaningful to an interpreter using any of several suitable and well-known display methods and means.

The data processing steps described above should be translated into a series of specific computer instructions in a manner that will be apparent to those ordinarily skilled in the art of computer programming for seismic data processing. The method steps preferably should be performed using any of many commercially available, appropriately programmed digital computers.

It will be apparent to those of ordinary skill in the field of seismic data processing that numerous variations on the above-described preferred embodiment may be implemented. The inventors consider that it is still within the scope of the invention to vary the above-described method as follows:

(a) Step 5 precedes set 4 or step 3;
(b) Steps 3 and 4 are interchanged;
(c) Steps 7 and 8 are interchanged;
(d) Steps 2 and 9 are omitted;
(e) Nonlinear interpolation is performed where, for simplicity, linear interpolation has been indicated; or
(f) Discrete Cosine Transforms or Discrete Sine Transforms are employed where Discrete Fourier Transforms have been indicated (any of several suitable conventional implementations of the Discrete Cosine Transforms or Discrete Sine Transform may be employed).

Other variations may be within the scope of the invention. Throughout this application (including in the claims), the phrase "Discrete Fourier Transform" (or "Discrete Inverse Fourier Transform") should be understood to denote any discrete transform selected from the group including Discrete Fourier Transforms, Discrete Cosine Transforms, and Discrete Sine Transforms (and the corresponding discrete inverse transformation).

Figure 2:
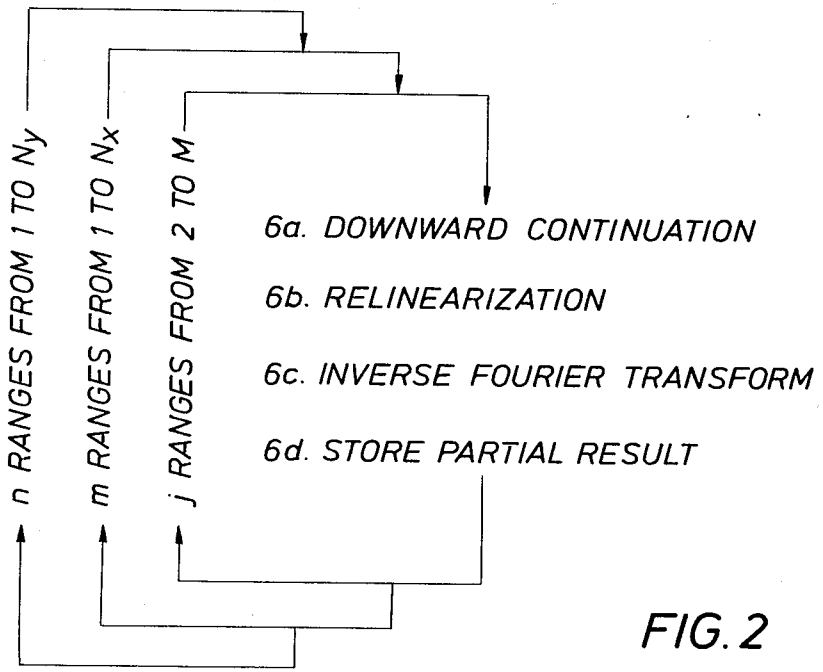
FIG. 2 is a diagram showing the iterations performed in performing the step of the invention known as "recursive KF migration".

The sixth step of the preferred embodiment ("Recursive KF Migration") will next be described. In this description, the symbol $W_N^{ij}$ will represent the complex number $\cos Q + \sqrt{-1} \sin Q$, where $Q = 2\pi ij/N$. The reference time-depth relation is defined by the set of numbers $\{t_j^{ref}, z_j^{ref}; 1 \leqq j \leqq M, M \geqq 2\}$. The recursive KF migration step is a sequence of operations carried out $M-1$ times in succession, as index j assumes values from 2 through M. This process is carried out separately for every possible combination of m and n. Each performance of recursive KF migration on a trace (identified by index pair m,n) reassigns a new value to each sample comprising the trace, to approximate changes in the seismic wave field as the source-receiver pair (or pairs) associated with index pair n,n are "moved" downward into the earth. The earth is modeled as a stack of M horizontal layers, each having, in general, a different seismic wave velocity, $v_j$ (to be defined precisely below). FIG. 2 shows the iteration cycles performed during application of recursive KF migration to a set of traces.

The first operation is known as downward continuation. In the first execution, when $j=2$, this sub-step is bypassed. In subsequent executions, each number $c[m-1)\Delta k_x, (n-1)\Delta k_y, (i-1)\Delta w]$ as it currently exists is multiplied by the corresponding factor $W_N^{pq}$ where $q = Int[(t_{j-1}^{ref} - t_{j-2}^{ref})/\Delta t]$, understanding that the symbol Int [ ] indicates that the expression within the brackets is to be rounded to the nearest integer, and $p = [(-I)^2 - k^2 V_{j-1}]^{\frac{1}{2}}$, $V_{j-1} = (z_{j-1}^{ref} - z_{j-2}^{ref})/(t_{j-1}^{ref} - t_{j-2}^{ref})$, $k^2 = (m-I)^2 (\Delta k_x/\Delta w)^2 + (n-I)^2 (\Delta k_y/\Delta w)^2$, provided that $i \geqq 1 + kV_{j-1}$; otherwise, $c[(m-1)\Delta k_x, (n-1)\Delta k_y, (i-1)\Delta w] = 0$.

The next operation is known as relinearization. For each sample index i, a quantity i' is computed according to $i' Int[1 + \{(i-1)^2 - k^2 V_j^2\}^{\frac{1}{2}}]$, $1 + kV_j \leqq i \leqq N/2 + 1$, or $i' = Int[N + 1 - \{(N+1-i)^2 - k^2 V_j^2\}^{\frac{1}{2}}]$, $N/2 + 1 < i \leqq N - kV_j$. The objective is to define $c'[(m-1)\Delta k_x, (n-1)\Delta k_y, (i'-1)\Delta w] = c[(=m-1)\Delta k_x, (n-1)\Delta k_y, (i-1)\Delta w]$. If some particular integer value i' is not among those defined in this manner, the corresponding value of c' is taken to be zero. Various interpolation methods are permissible to distribute any sample of c among several samples of c'. The restriction that must be observed is that $$\sum_{i'} c'[(m-1)\Delta k_x, (n-1)\Delta k_y, (i'-1)\Delta w] = \sum_{i} c[(m-1)\Delta k_x, (n-1)\Delta k_y, (i-1)\Delta w],$$

In the next operation, the set of numbers c' is subjected to a Discrete Inverse Fourier Transform on index i' to become $b[(m-1)\Delta k_x, (n-1)\Delta k_y, (i'-1)\Delta t]$, $1 \leqq i' \leqq N$.

In the next operation, one stores the partial result: $a[(m-1)\Delta k_x, (n-1)\Delta k_y, (i-1)\Delta t] = b[(m-1)\Delta k_x, (n-1)\Delta k_y, (i'-1)\Delta t]$, $1 + Int[t_{j-1}^{ref}/\Delta t] \leqq i < 1 + Int[t_j^{ref}/\Delta t]$. Thus, for each iteration associated with a particular value of j, some but not all of the values $b[(m-1)\Delta k_x, (n-1)\Delta k_y, (i-1)\Delta t]]$ are stored.

With reference to FIG. 2, the order in which different values of m and n are employed in performing recursive KF migration is immaterial. It is necessary that each possible combination of m and n be employed once and only once.

In the above description of the recursive KF migration step, let $V_{max}$ be defined as the maximum of the ratio $(z_j^{ref}-z_{j-1}^{ref})/(t_j^{ref}-t_{j-1}^{ref})$, considering all permissible values of j. Before carrying out the recursive KF migration operation, it may be useful to set $c[(m-1)\Delta k_x, (n-1)\Delta k_y, (i-1)\Delta w]=0$ for $1 \leqq i \leqq k\text{-}V_{max}/\sin d_{mig}$, where $k^2=(m-1)^2(\Delta k_x/\Delta w)^2$, $d_{mig}$ is arbitrary but restricted by the requirement $0< \sin d_{mig} \leqq 1$. It may furthermore be useful, before thus modifying the set of numbers c, to generate and set aside the set of numerical signals $$c_{save}(i)=c[(m-1)\Delta k_x,(n-1)\Delta k_y,(i-1)\Delta w]PS$$

for $(kV_{max}/\tan d_{noise}) \leqq i-1 \leqq (kV_{max}/\tan d_{mig})$ where $d_{noise}$ is arbitrary but restricted by the requirement $\tan d_{mig} \leqq \tan d_{noise}$. Then, during recursive KF migration, each time c' is computed, $c_{save}$ is added to c', sample by sample, over the range of samples for which $c_{save}$ is defined.

Numerous other variations on the inventive embodiment described above are with the scope of the invention. For example, the seismic data to be processed in accord with the invention may be stacked or unstacked. The preferred embodiment described above is suitable for processing zero-offset (i.e., stacked) data. With unstacked data, each input trace $g(x_s, y_s, x_R, y_R, t_i)$ will be associated with both a source position $(x_s, y_s)$ and a receiver position $(x_R, y_R)$; not with a single position (x,y) representing both source and receiver positions. Accordingly, where unstacked data are to be processed in accordance with the invention, modifications to the above-described must be made in a manner that will be apparent to one of ordinary skill in the seismic data processing art. In particular, the relations employed for downward continuation and relinearization will change to reflect what is known to those of ordinary skill in the art as the "Double Square Root" equation.

The above description is merely illustrative of the invention. It is contemplated that various changes in the details of the structures and methods described may be within the scope of the invention as defined by the appended claims.

We claim:

1. A method for processing a set of seismic traces, each trace corresponding to at least one location in a two-dimensional spatial grid (x,y), and each trace including a set of N time samples corresponding to time instants $\{t_i=i\Delta t: 1 \leqq i \leqq N\}$, given a time-depth relationship $\{t_i, z_i: 1 \leqq i \leqq N\}$ for each trace, said method including the steps of:

(a) determining a reduced set of time-depth pairs $\{t_j^{ref}, z_j^{ref}: 1 \leqq j \leqq M,\ M<N\}$, where $t_1=t_1^{av}=t_1^{ref}$, $z_1^{ref}=z_1^{av}$, $|t_i^{av}-[t_{j-1}^{ref}+(z_i^{av}-z_{j-1}^{ref})(t_j^{ref}-t_{j-1}^{ref})/(z_j^{ref}-z_{j-1}^{ref})]|<E$, where $t_{j-1}^{ref}<t_i^{av} \leqq t_j^{ref}$, $z_i^{av}$ is determined by adding together the depth values $z_i$ for each trace and dividing by the number of traces, and E is a selected acceptable tolerance on the order of about $10\Delta t$;

(b) subjecting each trace to Discrete Fourier Transforms on the spatial coordinates corresponding to the trace, and on time index i;

(c) performing recursive KF migration on the traces after they have been transformed in step (b); and (d) subjecting each migrated trace generated in step (c) to Discrete Inverse Fourier Transforms on the spatial coordinates corresponding thereto.

2. The method of claim 1, where each trace is a stacked trace $g(x,y,t_i)$, corresponding to a single point $(x_{mn}, y_{mn})$ in grid (x,y), and $(x_{mn}, y_{mn})$ is determined by the position coordinates of the seismic sources and receivers associated with the individual traces comprising the stacked trace.

3. The method of claim 1, where each trace is an unstacked trace $g(x_s, y_s, x_R, y_R, t_i)$ corresponding to a seismic source position $(x_s, y_s)$ and to an acoustic receiver position $(x_R, y_R)$.

* * * * *